US012020854B2

(12) United States Patent
Ohkubo et al.

(10) Patent No.: US 12,020,854 B2
(45) Date of Patent: Jun. 25, 2024

(54) COIL COMPONENT

(71) Applicant: TDK CORPORATION, Tokyo (JP)

(72) Inventors: Hitoshi Ohkubo, Tokyo (JP); Miyuki Asai, Tokyo (JP); Masazumi Arata, Tokyo (JP); Hokuto Eda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 459 days.

(21) Appl. No.: 17/115,311

(22) Filed: Dec. 8, 2020

(65) Prior Publication Data

US 2021/0183566 A1 Jun. 17, 2021

(30) Foreign Application Priority Data

Dec. 11, 2019 (JP) ................................. 2019-223911

(51) Int. Cl.
*H01F 27/32* (2006.01)
*H01F 17/04* (2006.01)

(52) U.S. Cl.
CPC ........... *H01F 27/324* (2013.01); *H01F 17/04* (2013.01); *H01F 2017/048* (2013.01)

(58) Field of Classification Search
CPC ... H01F 27/324; H01F 17/04; H01F 2017/048
See application file for complete search history.

(56) References Cited

U.S. PATENT DOCUMENTS

2003/0214793 A1* 11/2003 Uchida ............... H01F 17/0013 361/761
2006/0014303 A1* 1/2006 Takazawa ........... H01F 17/0013 438/1
2014/0145814 A1* 5/2014 Lee ..................... H01F 17/0013 336/200
2014/0184374 A1* 7/2014 Park .................... H01F 17/0013 336/83
2015/0325369 A1* 11/2015 Inoue ....................... H01G 2/12 336/200
2015/0371752 A1* 12/2015 Park ...................... H01F 27/255 336/200
2016/0012961 A1* 1/2016 Suzuki .................... H01F 27/29 29/602.1
2016/0086714 A1* 3/2016 Moon .................. H01F 27/255 336/200
2016/0086716 A1* 3/2016 Choi ................... H01F 17/0013 427/127
2016/0240296 A1* 8/2016 Kim ........................ H01F 17/04
2016/0260535 A1* 9/2016 Kubota ............... H01F 17/0013
2016/0268038 A1* 9/2016 Choi ..................... H01F 27/255
2016/0276089 A1* 9/2016 Inoue ........................ B22F 7/08
2017/0243689 A1* 8/2017 Yoon ....................... H01F 17/04
(Continued)

FOREIGN PATENT DOCUMENTS

JP 2016-178282 A 10/2016

*Primary Examiner* — Malcolm Barnes
(74) *Attorney, Agent, or Firm* — Oliff PLC

(57) ABSTRACT

In a coil component, the pressure resistance is improved by main surfaces and of a main body portion being covered with an insulating layer. The main body portion has a surface part, the resin ratio of the surface part is higher than the internal resin ratio, and insulation is enhanced at the surface part. As a result, the pressure resistance on the surface of the main body portion is further improved and the pressure resistance of the entire coil component is further improved.

6 Claims, 6 Drawing Sheets

(56) References Cited

U.S. PATENT DOCUMENTS

| | | | | |
|---|---|---|---|---|
| 2018/0033533 A1* | 2/2018 | Ryu | .................... | H01F 17/0013 |
| 2018/0233272 A1* | 8/2018 | Araki | .................. | H01F 41/0246 |
| 2019/0189340 A1* | 6/2019 | Kim | .......................... | H01F 3/08 |
| 2019/0326041 A1* | 10/2019 | Kawaguchi | ............... | H01F 1/06 |
| 2020/0328021 A1* | 10/2020 | Yamashita | ................ | H01F 3/08 |
| 2021/0043365 A1* | 2/2021 | Ooi | ..................... | H01F 41/0246 |
| 2021/0057146 A1* | 2/2021 | Yang | ................... | H01F 17/0013 |

* cited by examiner

COIL COMPONENT

CROSS-REFERENCE TO RELATED APPLICATIONS

This application is based upon and claims the benefit of priority from Japanese Patent Application No. 2019-223911, filed on 11 Dec. 2019, the entire contents of which are incorporated herein by reference.

TECHNICAL FIELD

The present disclosure relates to a coil component.

BACKGROUND

As an example of coil components according to the related art, U.S. Unexamined Patent Publication No. 2016/0086714 (Patent Literature 1) discloses a coil component in which the surface of an element body made of a magnetic powder-containing resin is covered with an insulating layer. With such a coil component, the pressure resistance of the entire component can be improved by the insulating layer increasing the pressure resistance of the surface of the element body.

The inventors have repeated research on the pressure resistance of the surface of the element body and have newly found a technique with which the pressure resistance of the entire component can be further increased.

SUMMARY

An object of the present disclosure is to provide a coil component having an improved pressure resistance.

The coil component according to one aspect of the present disclosure includes an element body made of a metal magnetic powder-containing resin, and having a surface part having a resin ratio higher than an internal resin ratio, a coil is provided in the element body, and an insulating layer made of resin, and covering a surface of the element body including the surface part.

In the coil component, the pressure resistance is improved by the surface of the element body being covered with the insulating layer. The element body has the surface part, the resin ratio of the surface part is higher than the internal resin ratio, and insulation is enhanced at the surface part. As a result, the pressure resistance on the surface of the element body is further improved and the pressure resistance of the entire coil component is further improved.

In the coil component according to another aspect, a plurality of micro depressions are formed in the surface part of the element body.

In the coil component according to another aspect, the resin of the insulating layer fills in the plurality of micro depressions.

In the coil component according to another aspect, a depth of the micro depression is equal to or less than a maximum particle diameter of the metal magnetic powder constituting the metal magnetic powder-containing resin of the element body.

DETAILED DESCRIPTION

Figure 1:
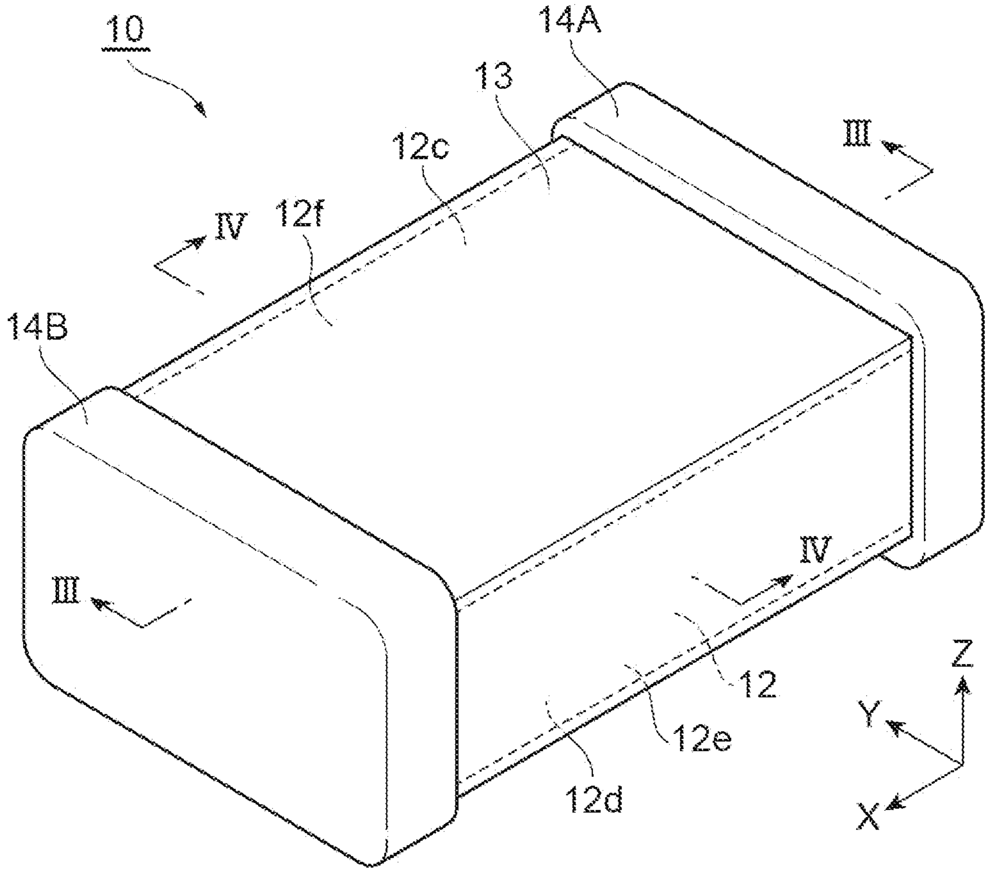
FIG. 1 is a schematic perspective view of the coil component according to an embodiment.

Hereinafter, an embodiment of the present disclosure will be described in detail with reference to the accompanying drawings. In the description, the same reference numerals are used for the same elements or elements having the same function and redundant description is omitted.

The structure of the coil component according to the embodiment will be described with reference to FIGS. 1 to 4. For convenience of description, XYZ coordinates are set as illustrated in the drawings. In other words, the thickness direction of the coil component is set as the Z direction, the facing direction of external terminal electrodes is set as the X direction, and the direction that is orthogonal to the Z direction and the X direction is set as the Y direction.

A coil component 10 is a flat coil element and includes a main body portion 12 (element body) having a rectangular parallelepiped shape and a pair of external terminal electrodes 14A and 14B provided on the surface of the main body portion 12. The main body portion 12 has a pair of end surfaces 12*a* and 12*b* facing each other in the X direction, a pair of main surfaces 12*c* and 12*d* facing each other in the Z direction, and a pair of side surfaces 12*e* and 12*f* facing each other in the Y direction. The pair of external terminal electrodes 14A and 14B are provided so as to cover the entire surfaces of the pair of end surfaces 12*a* and 12*b*. As an example, the coil component 10 is designed to have a long-side dimension of 2.5 mm, a short-side dimension of 2.0 mm, and a height dimension of 0.8 to 1.0 mm.

The main body portion 12 is configured to include an insulating substrate 20, a coil C provided on the insulating substrate 20, and a magnetic body 26.

The insulating substrate 20 is a plate-shaped member made of a non-magnetic insulating material and has a substantially elliptical ring shape when viewed from the thickness direction of the insulating substrate 20. An elliptical through hole 20*c* is provided at the middle part of the insulating substrate 20. A substrate in which a glass cloth is impregnated with an epoxy-based resin and that has a plate thickness of 10 μm to 60 μm can be used as the insulating substrate 20. It should be noted that BT resin, polyimide, aramid, and so on can also be used in addition to the epoxy-based resin. Ceramic or glass can also be used as the material of the insulating substrate 20. A mass-produced printed board material may be the material of the insulating substrate 20. In particular, a resin material used for a BT, FR4, or FR5 printed board may be the material of the insulating substrate 20.

The coil C has a first coil portion 22A where a first conductor pattern 23A for a flat air-core coil provided on one surface 20*a* (upper surface in FIG. 2) of the insulating substrate 20 is insulated and coated, a second coil portion 22B where a second conductor pattern 23B for a flat air-core coil provided on the other surface 20*b* (lower surface in FIG. 2) of the insulating substrate 20 is insulated and coated, and a through hole conductor 25 connecting the first conductor pattern 23A and the second conductor pattern 23B.

Figure 2:
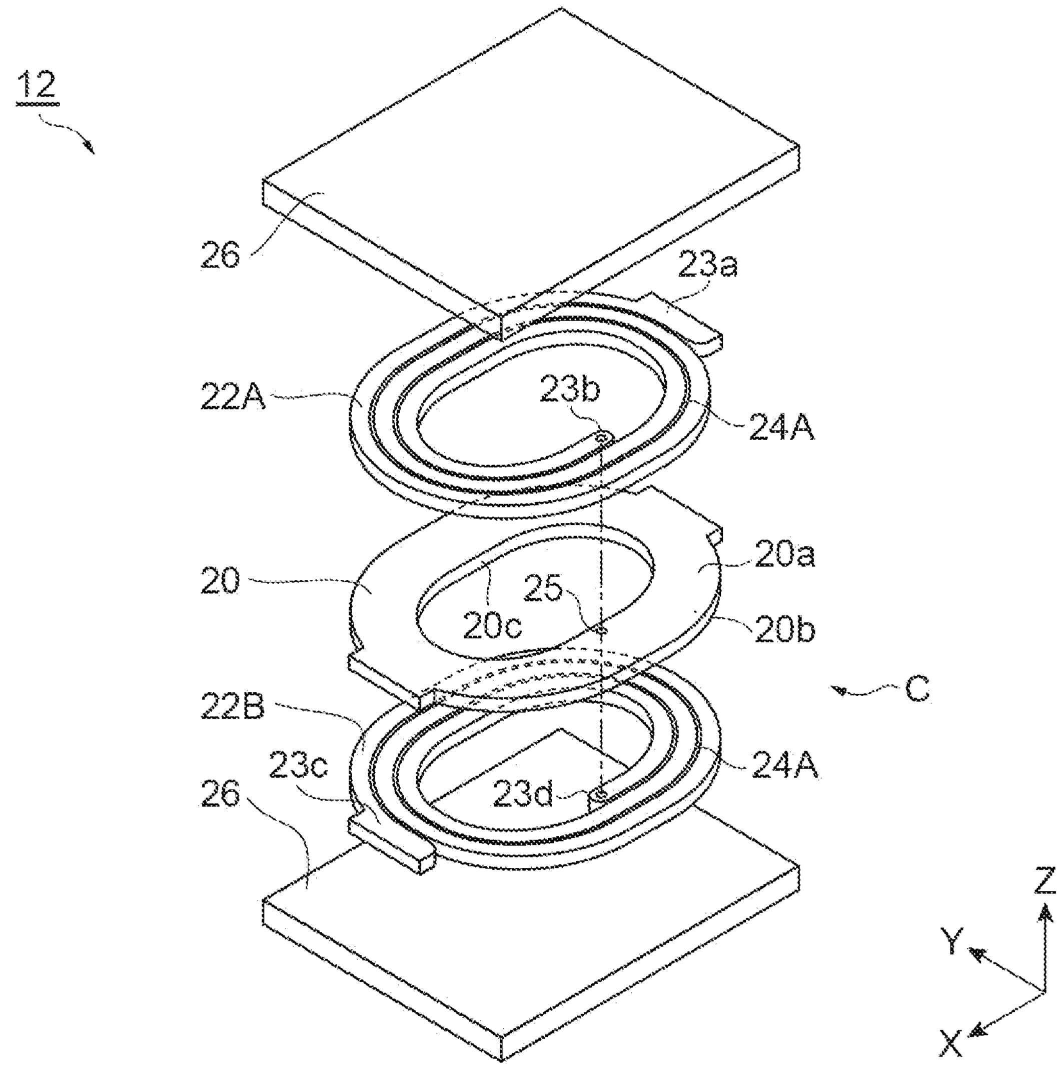
FIG. 2 is an exploded view of the coil component illustrated in FIG. 1.

The first conductor pattern 23A (first planar coil pattern) is a planar spiral pattern serving as a flat air-core coil and is plating-formed of a conductor material such as Cu. The first conductor pattern 23A is formed so as to be wound around the through hole 20*c* of the insulating substrate 20. More specifically, as illustrated in FIG. 2, the first conductor pattern 23A is wound clockwise, by three turns, and toward the outside when viewed from the upward direction (Z direction). The height of the first conductor pattern 23A (length in the thickness direction of the insulating substrate 20) is the same over the entire length.

An outside end portion 23*a* of the first conductor pattern 23A is exposed on the end surface 12*a* of the main body portion 12 and is connected to the external terminal electrode 14A covering the end surface 12*a*. An inside end portion 23*b* of the first conductor pattern 23A is connected to the through hole conductor 25.

As in the case of the first conductor pattern 23A, the second conductor pattern 23B (second planar coil pattern) is a planar spiral pattern serving as a flat air-core coil and is plating-formed of a conductor material such as Cu. The second conductor pattern 23B is also formed so as to be wound around the through hole 20*c* of the insulating substrate 20. More specifically, the second conductor pattern 23B is wound counterclockwise, by three turns, and toward the outside when viewed from the upward direction (Z direction). In other words, the second conductor pattern 23B is wound in the direction that is opposite to the winding direction of the first conductor pattern 23A when viewed from the upward direction. The height of the second conductor pattern 23B is the same over the entire length and can be designed to be the same as the height of the first conductor pattern 23A.

An outside end portion 23*c* of the second conductor pattern 23B is exposed on the end surface 12*b* of the main body portion 12 and is connected to the external terminal electrode 14B covering the end surface 12*b*. An inside end portion 23*d* of the second conductor pattern 23B is aligned with the inside end portion 23*b* of the first conductor pattern 23A in the thickness direction of the insulating substrate 20 and is connected to the through hole conductor 25.

The through hole conductor 25 is provided through the edge region of the through hole 20*c* of the insulating substrate 20 and connects the end portion 23*b* of the first conductor pattern 23A and the end portion 23*d* of the second conductor pattern 23B. The through hole conductor 25 may include a hole provided in the insulating substrate 20 and a conductive material (for example, a metal material such as Cu) with which the hole is filled. The through hole conductor 25 has a substantially cylindrical or substantially prismatic outer shape extending in the thickness direction of the insulating substrate 20.

Figure 3:
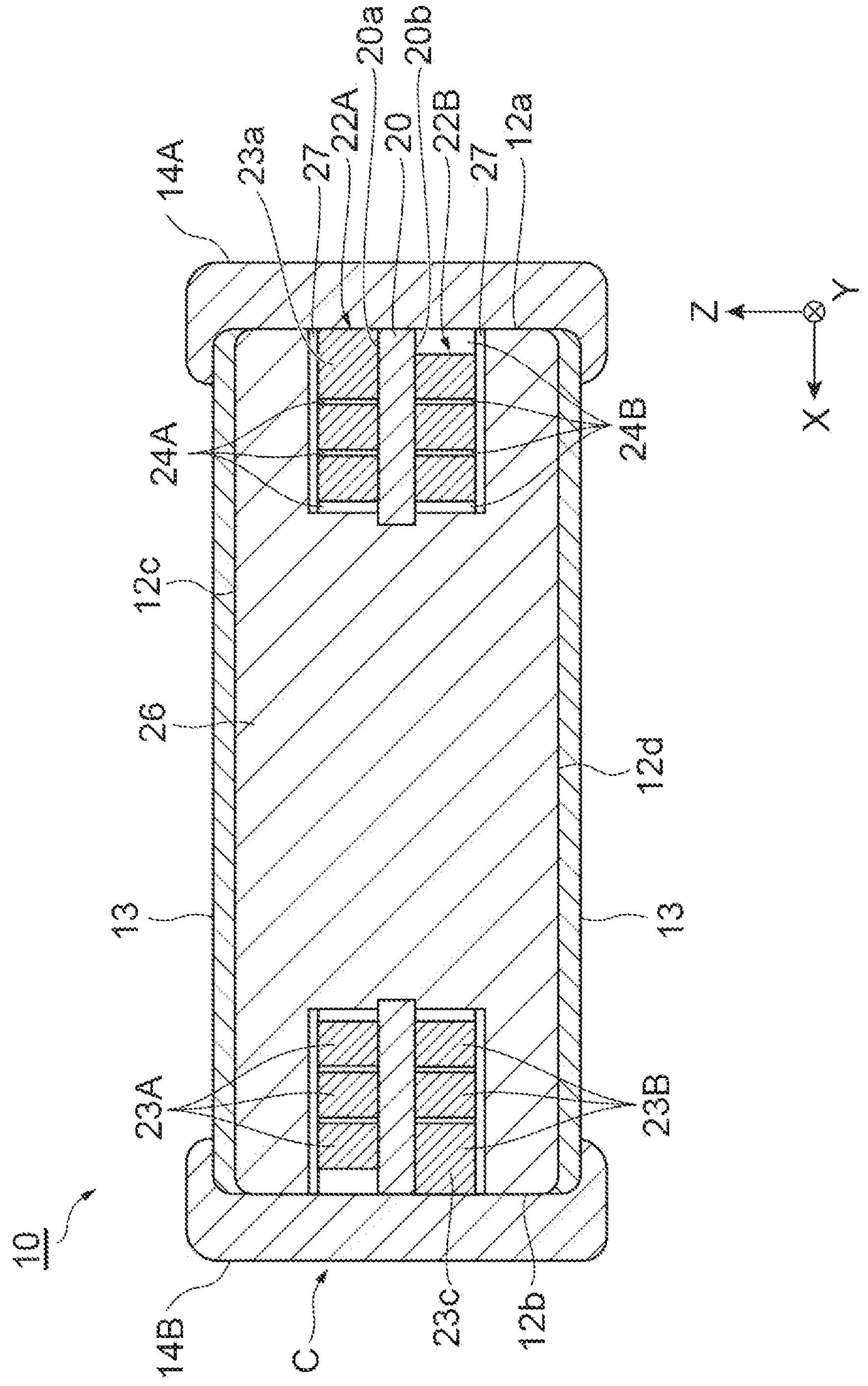
FIG. 3 is a cross-sectional view taken along line III-III of the coil component illustrated in FIG. 1.
Figure 4:
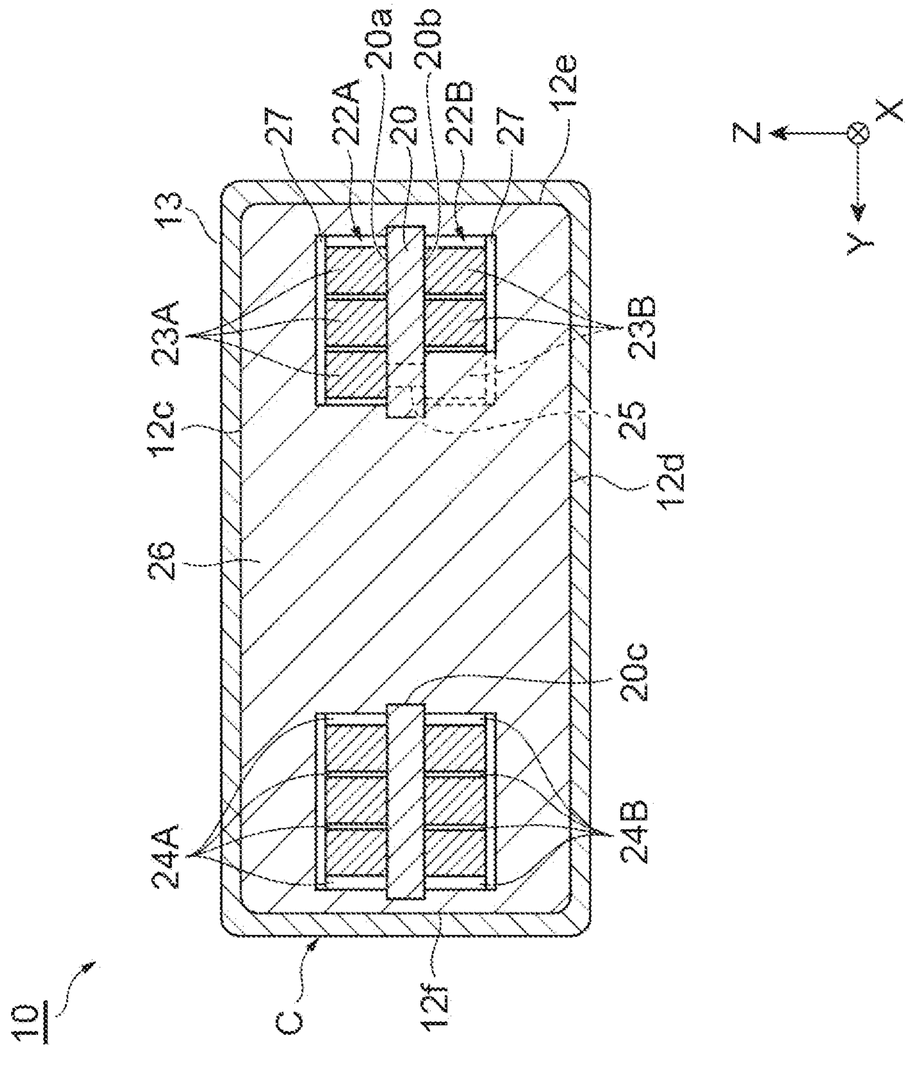
FIG. 4 is a cross-sectional view taken along line IV-IV of the coil component illustrated in FIG. 1.

In addition, as illustrated in FIGS. 3 and 4, the first coil portion 22A and the second coil portion 22B have resin walls 24A and 24B, respectively. The resin wall 24A of the first coil portion 22A is positioned between the lines and on the inner circumference and the outer circumference of the first conductor pattern 23A. Likewise, the resin wall 24B of the second coil portion 22B is positioned between the lines and on the inner circumference and the outer circumference of the second conductor pattern 23B. In the present embodiment, the resin walls 24A and 24B that are positioned on the inner and outer circumferences of the conductor patterns 23A and 23B are designed to be thicker than the resin walls 24A and 24B that are positioned between the lines of the conductor patterns 23A and 23B.

The resin walls 24A and 24B are made of an insulating resin material. The resin walls 24A and 24B can be provided on the insulating substrate 20 before the first conductor pattern 23A and the second conductor pattern 23B are formed. In this case, the first conductor pattern 23A and the second conductor pattern 23B are plated and grown between the walls that are defined in the resin walls 24A and 24B. The resin walls 24A and 24B can be provided on the insulating substrate 20 after the first conductor pattern 23A and the second conductor pattern 23B are formed. In this case, the resin walls 24A and 24B are provided on the first conductor pattern 23A and the second conductor pattern 23B by filling, coating, or the like.

Each of the first coil portion 22A and the second coil portion 22B has an insulating layer 27, which integrally covers the first conductor pattern 23A and the second conductor pattern 23B and the resin walls 24A and 24B from the upper surface side. The insulating layer 27 may be made of an insulating resin or an insulating magnetic material.

The magnetic body 26 integrally covers the insulating substrate 20 and the coil C. More specifically, the magnetic body 26 covers the insulating substrate 20 and the coil C from the upward-downward directions and covers the outer circumference of the insulating substrate 20 and the coil C. In addition, the inner portion of the through hole 20*c* of the insulating substrate 20 and the inside region of the coil C are filled with the magnetic body 26. The magnetic body 26 constitutes all the surfaces of the main body portion 12, that is, the end surfaces 12*a* and 12*b*, the main surfaces 12*c* and 12*d*, and the side surfaces 12*e* and 12*f*.

The magnetic body 26 is made of a resin containing metal magnetic powder. The metal magnetic powder-containing resin is binder powder in which metal magnetic powder 28 is bound by a binder resin 30. The metal magnetic powder of the metal magnetic powder-containing resin constituting the magnetic body 26 is configured to include magnetic powder containing at least Fe (for example, iron-nickel alloy (permalloy alloy), carbonyl iron, amorphous, non-crystalline or crystalline FeSiCr-based alloy, and sendust). The binder resin 30 is, for example, a thermosetting epoxy resin. In the present embodiment, the content of the metal magnetic powder in the binder powder is 80 to 92 vol % by volume and 95 to 99 wt % by mass. From the viewpoint of magnetic properties, the content of the metal magnetic powder in the hinder powder may be 85 to 92 vol % by volume and 97 to 99 wt % by mass. The magnetic powder of the metal magnetic powder-containing resin constituting the magnetic body 26 may be powder having one type of average particle diameter or may be mixed powder having a plurality of types of average particle diameters. In a case where the metal magnetic powder of the metal magnetic powder-containing resin constituting the magnetic body 26 is mixed powder, the types and Fe composition ratios of the magnetic powders having different average particle diameters may be the same or different. As an example, in the case of mixed powder having three types of average particle diameters, the particle diameter of the magnetic powder having the maximum average particle diameter (large-diameter powder 28*a*) can be 15 to 30 μm, the particle diameter of the magnetic powder having the minimum average particle diameter (small-diameter powder 28*b*) can be 0.3 to 1.5 μm, and the magnetic powder having an average particle diameter between the large-diameter powder and the small-diameter powder (medium-diameter powder 28*c*) can be 3 to 10 μm. With respect to 100 parts by weight of the mixed powder, the large-diameter powder 28*a* may be contained in the range of 60 to 80 parts by weight, the medium-diameter powder 28*c* may be contained in the range of 10 to 20 parts by weight, and the small-diameter powder 28*b* may be contained in the range of 10 to 20 parts by weight.

The average particle diameter of the metal magnetic powder is defined by the particle diameter at an integrated value of 50% in the particle size distribution (d50, so-called median diameter) and is obtained as follows. A scanning electron microscope (SEM) photograph of a cross section of the magnetic body 26 is taken. Image processing is performed on the taken SEM photograph by software, the boundary of the metal magnetic powder is determined, and the area of the metal magnetic powder is calculated. The particle diameter is calculated by the calculated area of the metal magnetic powder being converted into a circle-equivalent diameter. For example, the particle diameter of 100 or more metal magnetic powders is calculated and the particle size distribution of these metal magnetic powders is obtained. The average particle diameter d50 is the particle diameter at an integrated value of 50% in the obtained particle size distribution. The particle shape of the metal magnetic powder is not particularly limited.

The magnetic body 26 is capable of containing metal magnetic powder having a particle diameter exceeding the upper limit value of the average particle diameter of the large-diameter powder 28*a* (for example, 30 μm). In the present embodiment, the magnetic body 26 contains metal magnetic powder having a maximum particle diameter of 100 μm.

In the coil component 10, each of the pair of main surfaces 12*c* and 12*d* and the pair of side surfaces 12*e* and 12*f* of the main body portion 12 is entirely covered with an insulating layer 13. The insulating layer 13 is made of a thermosetting resin. As an example, the insulating layer 13 is made of epoxy resin. The insulating layer 13 can be formed by, for example, the resin material applied on the main surfaces 12*c* and 12*d* and the side surfaces 12*e* and 12*f* being cured (for example, heat-cured).

Here, the state of the interface between the element body and the insulating layer will be described with reference to FIG. 5.

Figure 5:
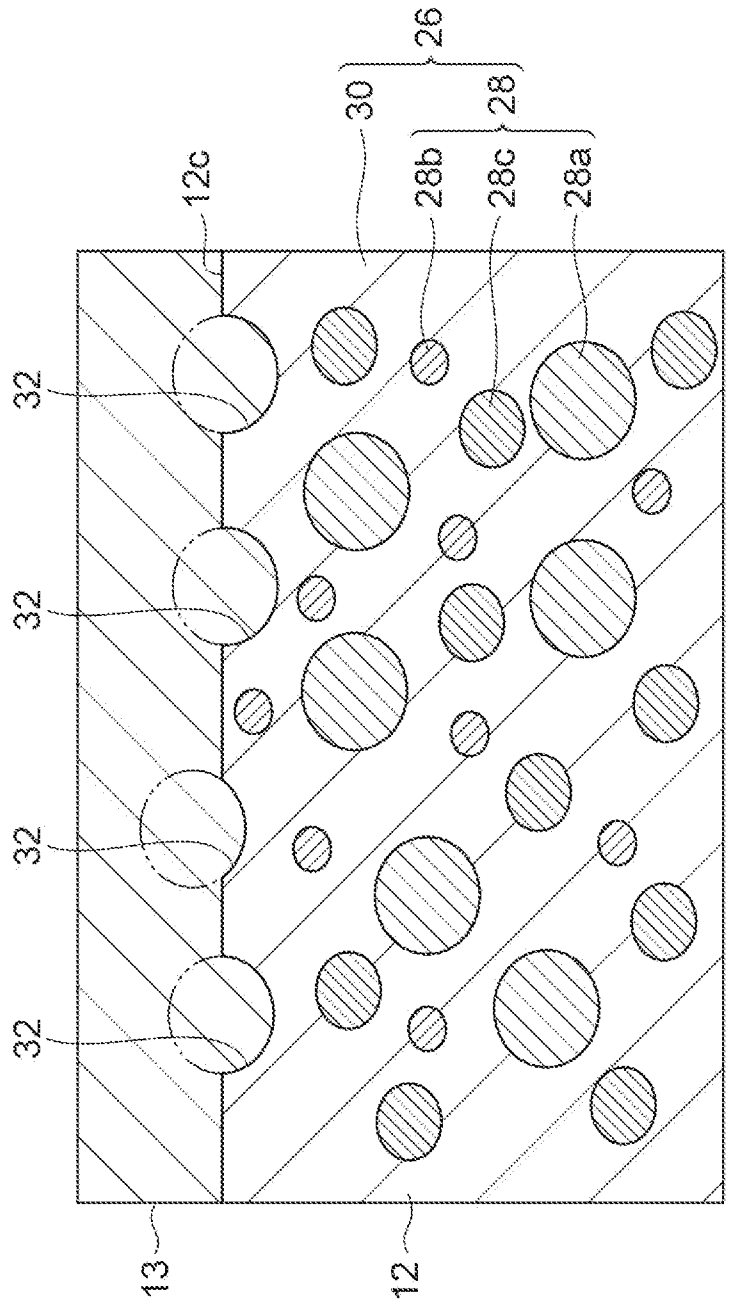
FIG. 5 is an enlarged cross-sectional view of a main part illustrating the interface between an element body and an insulating layer.

As illustrated in FIG. 5, a plurality of micro depressions 32 are formed in the main surface 12*c* of the main body portion 12. These micro depressions 32 are formed by the metal magnetic powder 28 of the metal magnetic powder-containing resin constituting the magnetic body 26 being desorbed from the binder resin 30. Accordingly, the maximum depth of the micro depression 32 is equal to or less than the maximum particle diameter of the metal magnetic powder 28 contained in the magnetic body 26 (for example, 100 μm). The desorption of the metal magnetic powder 28 can occur after the main surface 12*c* of the main body portion 12 is polished and etched. The main surface 12*c* of the main body portion 12 has a somewhat large surface roughness (for example, $R_{max}$=50 μm) due to the plurality of micro depressions 32. The resin material that constitutes the insulating layer 13 fills in each of the plurality of micro depressions 32, and the micro depressions 32 are filled with the resin material.

It should be noted that the other main surface 12*d* of the main body portion 12 has the same surface state as the main surface 12*c* and the resin material of the insulating layer 13 covering the main surface 12*d* fills in the micro depression 32 formed in the main surface 12*d*.

Due to the desorption of the metal magnetic powder 28 described above, the magnetic powder ratio of the main surface 12*c* of the main body portion 12 is lower than the magnetic powder ratio of the inner portion of the element body. In other words, the resin ratio of the main surface 12*c* of the main body portion 12 is higher than the resin ratio of the inner portion of the element body.

In the coil component 10, the pressure resistance is improved by the main surfaces 12*c* and 12*d* of the main body portion 12 being covered with the insulating layer 13. The main body portion 12 has a surface part, the resin ratio of the surface part is higher than the internal resin ratio, and insulation is enhanced at the surface part. As a result, the pressure resistance on the surface of the main body portion 12 is further improved and the pressure resistance of the entire coil component 10 is further improved.

In addition, in the coil component 10, the surface part having the resin ratio higher than the internal resin ratio is formed only on the main surfaces 12*c* and 12*d* extending between the external terminal electrodes 14A and 14B and the surface part is covered with the insulating layer 13. Alternatively, the surface part of the surface of the main body portion 12 where the resin ratio is higher than the internal resin ratio may be at least one of the main surfaces 12*c* and 12*d*, may be at least one of the side surfaces 12*e* and 12*f*, or may be both the main surfaces 12*c* and 12*d* and the side surfaces 12*e* and 12*f*.

Figure 6:
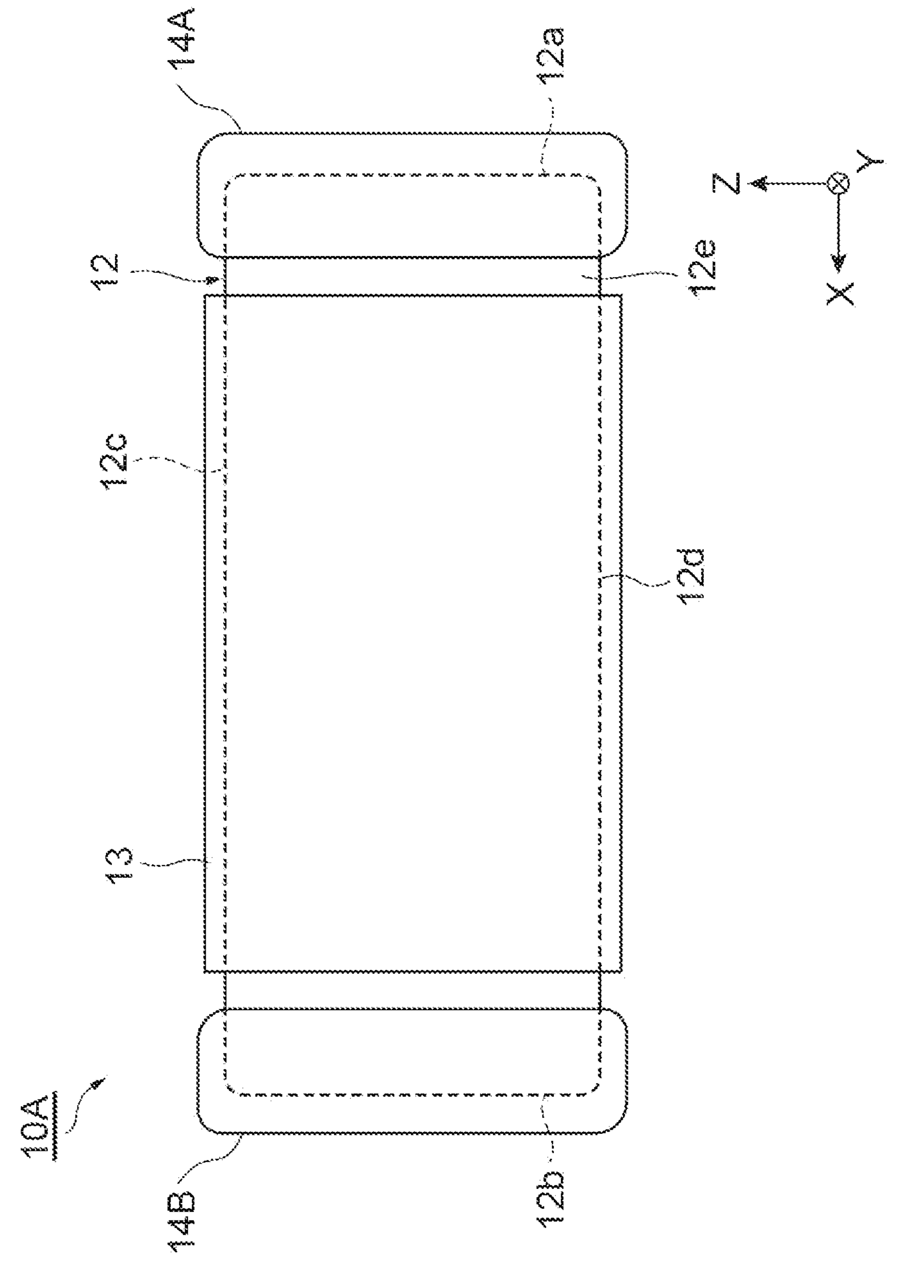
FIG. 6 is a side view illustrating the coil component of another aspect.

The insulating layer 13 may cover the main surfaces 12*c* and 12*d* and the side surfaces 12*e* and 12*f* in whole or in part. For example, the surface of the main body portion 12 may be exposed from between the insulating layer 13 and the external terminal electrodes 14A and 14B as in a coil component 10A illustrated in FIG. 6. In the coil component 10A, the insulating layer 13 is provided only in the middle regions of the main surfaces 12*c* and 12*d* and the side surfaces 12*e* and 12*f* without being provided on the end surface 12*a* and 12*b* sides of the main surfaces 12*c* and 12*d* and the side surfaces 12*e* and 12*f*.

It should be noted that the present disclosure may take various aspects without being limited to the above-described embodiment. For example, the coil C may be provided with both the first coil portion and the second coil portion or may be provided only with the first coil portion.

What is claimed is:

1. A coil component comprising:

an element body made of a metal magnetic powder-containing resin, and having a surface part having a resin ratio in the metal magnetic powder-containing resin constituting the element body higher than an internal resin ratio;

a coil provided in the element body; and an insulating layer made of resin, and covering a surface of the element body including the surface part, wherein a main body portion of the element body has a region covered by the insulating layer and a region disclosed by the insulating layer, and the region disclosed by the insulating layer is a portion of the surface part that is exposed between the insulating layer and an external terminal electrode provided on the main body portion.

2. The coil component according to claim 1, wherein a plurality of micro depressions are formed in the surface part of the element body.

3. The coil component according to claim 2, wherein the resin of the insulating layer fills in the plurality of micro depressions.

4. The coil component according to claim 2, wherein a depth of the micro depression is equal to or less than a maximum particle diameter of the metal magnetic powder constituting the metal magnetic powder-containing resin of the element body.

5. The coil component according to claim 3, wherein a depth of the micro depression is equal to or less than a maximum particle diameter of the metal magnetic powder constituting the metal magnetic powder-containing resin of the element body.

6. The coil component according to claim 1, wherein the element body and the surface part are integrally formed.

* * * * *